United States Patent Office 3,434,395
Patented Mar. 25, 1969

3,434,395
PRESSURE RESPONSIVE MECHANISM
Ralph K. Londal, Detroit, Mich., assignor to Holley
Carburetor Company, Warren, Mich., a corporation of Michigan
Filed Oct. 26, 1964, Ser. No. 406,502
Int. Cl. F15b 15/10; G05d 7/03
U.S. Cl. 92—6                 5 Claims

ABSTRACT OF THE DISCLOSURE

This application discloses a gas turbine engine bypass type fuel supply system including a fuel tank, a fuel pump and a fuel control for automatically scheduling the quantity of fuel supplied to the engine, as determined by the position of a manual power selector lever and other suitable engine operating parameters, the system including a force balance mechanism continuously controlling indirectly the quantity of fuel supplied to the engine by directly controlling the portion of the pump output that is bypassed to the pump inlet, the force balance mechanism including a lever actuating the fuel bypass valve and means responsive to an engine operating pressure, such as compressor discharge pressure, connected to said lever so as to apply an input force thereto, said pressure responsive means being formed to provide an effective area for pressures below a predetermined pressure and another different effective area for pressures above said predetermined pressure, whereby the input force has one linear relationship with respect to pressure for pressures below the predetermined pressure and another different linear relationship with respect to pressure for pressures above the predetermined pressure.

---

This invention relates generally to moment or force balance systems, and more particularly to a dual-effect pressure responsive actuating device therefor.

It is common practice in force balance systems, particularly in closed-loop moment balance systems for gas turbine engine fuel controls, to produce an output force which has a linear relationship to a particular operating parameter, such as compressor discharge pressure, for example. The output force may create a pressure drop across a fuel metering valve, which is proportional to the fuel flow therepast. In some instances, however, it is necessary to bias a portion of such a linear curve such as, for example, in order to obtain a suitable engine starting schedule.

Accordingly, a general object of the invention is to provide a novel means for biasing an output force relative to an actuating pressure over a portion of the curve thereof.

A more specific object of the invention is to provide such a means which comprises a dual area pressure responsive device, wherein a low operating pressure is effective against both of the areas, whereas a high operating pressure is effective against only one of the areas.

Other objects and advantages of the invention will become more apparent when reference is made to the following specification and the accompanying drawings wherein.

Figure 1:
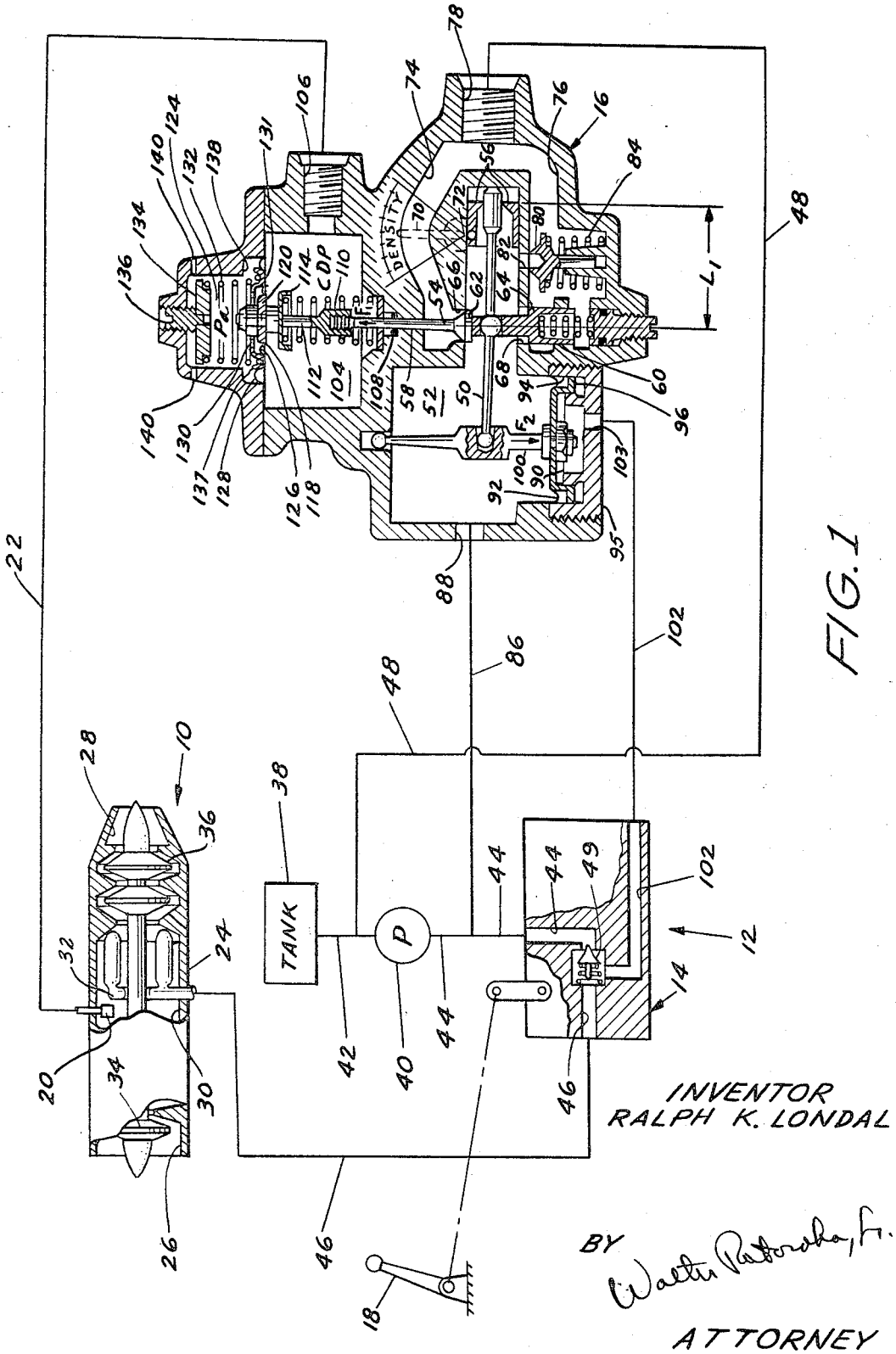
FIGURE 1 is a schematic illustration of a gas turbine engine having a fuel control system embodying the invention, which is shown in cross-section.

Referring now in greater detail to the drawings, FIGURE 1 illustrates schematically a gas turbine engine 10 having a fuel control system 12 including a fuel metering system, represented generally by 14, and an acceleration fuel system, represented generally by 16. The fuel control system 12 is responsive to manual control by means of a selector lever 18, to compressor discharge pressure via a pressure probe 20 and a conduit 22, as well as to various other parameters (not shown) such as engine speed, temperature and engine pressures other than compressor discharge pressure. However, no limitations are intended by the particular parameters employed in the present disclosures for purposes of illustration because other parameters may serve the purposes of the invention.

A typical gas turbine engine 10 includes an outer housing 24 with an intake 26 and an exhaust nozzle 28. A combustion chamber 30 having a fuel distribution ring 32 therein is located within the housing 24 between the compressor 34 and the turbine 36.

The fuel supply system generally comprises a fuel tank 38, an engine driven pump 40, and supply conduits 42 and 44 which deliver fuel to the fuel control 12. The fuel control 12 meters the correct fuel flow for the particular engine operating requirements, as dictated by the above mentioned compressor discharge pressure parameters in a manner which will be described below. In the particular control illustrated, correctly metered fuel is transferred to the fuel distribution ring 32 via a conduit 46, any excess fuel being bypassed back to the inlet side of the pump 40 via a return conduit 48, in a manner to be described.

As previously mentioned, the fuel control 12 comprises a fuel metering system 14 operating in conjunction with a moment balance system 16. In the control shown, a fuel metering valve, represented generally as 49, produces a linear relationship between metered flow and pressure drop across the valve, as was more fully described and illustrated in application Ser. No. 264,117 filed on Mar. 11, 1963 in the name of Warren H. Cowles, now abandoned.

The moment balance system 16 disclosed herein similar to that described in the above mentioned abandoned application, except as modified to incorporate the invention. Thus, the complete moment balance system 16, as improved, includes a force balance lever 50 pivotally secured to the housing 16 in one of the chambers 52 therein. A valve stem 54 is pivotally connected to the lever arm 50 at a predetermined distance $L_1$ from the pivot members 56 of the lever 50, so as to be positioned substantially perpendicular to the lever arm 50. The extensions 58 and 60 of the valve stem 54 may be slidably confined within the walls of the housing 16. Two spaced shoulders 62 and 64 formed on the stem 54 function, in co-operation with a pair of annular openings or valve seats 66 and 68 formed within the housing 16, as a pair of valves.

If desired, fuel density variations may be compensated for by manually moving a lever 70 which pivots about the pin 72 to vary the location of the pivot members 56, and hence the length $L_1$.

A pair of passageways 74 and 76 communicate between the openings 66 and 68 and an outlet 78 leading to the conduit 48 which returns to the inlet side of the pump 40. If desired, the passageway 76 may include a pressure relief valve 80 which is urged closed against an opening 82 between the chamber 52 and the passageway 76 by a spring 84. Communication to the chamber 52 may be via the conduit 44, a branch conduit 86 and the inlet 88. Of course, the conduit 86 may actually be a passageway through the system 14, upstream of the usual fuel metering valve 49 included therein.

A second annular chamber 90 is formed by mounting a so-called feedback diaphragm 92 across a recess 94 formed in a plug 95 threaded into a wall of the chamber 52, a washer 96 being fastened in the usual manner to the diaphragm 92. A stem 100 extends from the diaphragm 92 into the chamber 52 and is pivotally attached to the lever arm 50 at a second predetermined distance from the fixed pivot point 56. The chamber 90 is subjected, via a passageway 102 and an inlet 103, to fluid flowing past the usual fuel metering valve 49 of the system 14. As such the pressure differential across diaphragm 92 may be lineally proportional to the flow past the metering valve 49.

Another chamber 104 of the moment balance system 16 includes an inlet 106 through which the chamber 104 is subjected to air at compressor discharge pressure, CDP, via the conduit 22. The conduit 22 may include a fixed restriction (not shown) which would serve to stabilize the system.

A low pressure seal 108 is sufficient to separate the air chamber 104 from the low pressure fuel passageway 74 adjacent the high pressure fuel chamber 52. In view of its position in a low pressure area, the seal 108 may be an ordinary diaphragm, if desired.

In accordance with the invention, a threaded end 110 is formed on the end of the valve stem extension 58 which extends into the air chamber 104. A member 112 is threadedly secured to the end 110 and has a spring retainer flange 114 formed at an intermediate point thereof. A spring 116 is confined between the spring retainer 114 and a wall of the chamber 104 adjacent the low pressure seal 108. A specially formed diaphragm 118 is clamped adjacent its central opening against a shoulder formed on the member 112 by means of a ring 120, the latter being held in place around the member 112 by any suitable means, such as a nut 122.

Figure 2:
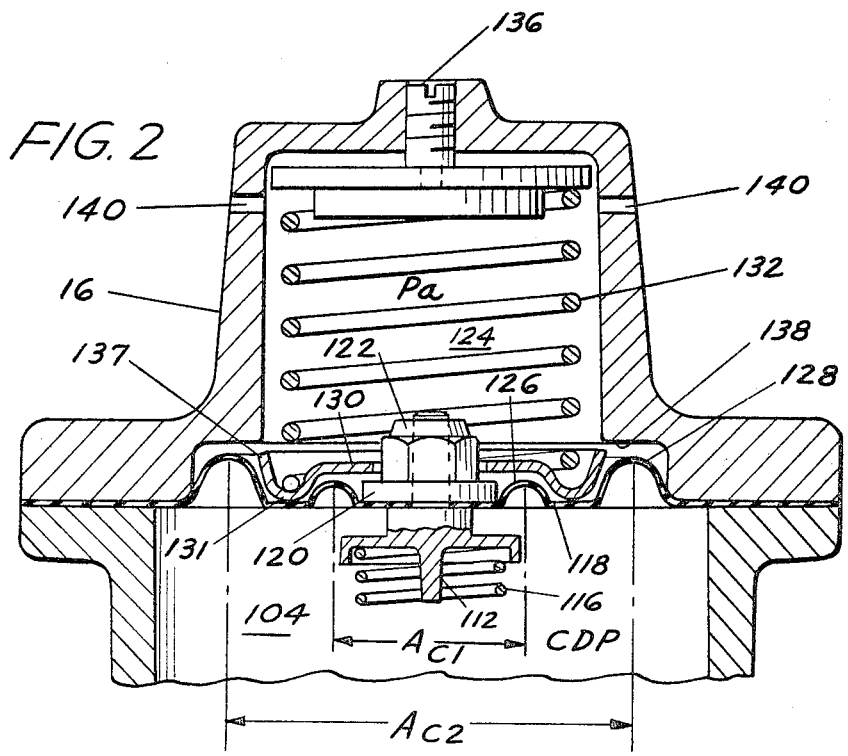
FIGURE 2 is an enlarged fragmentary portion of FIGURE 1.

The diaphragm 118 forms a movable wall between the chamber 104 and another chamber 124 formed within the fuel acceleration housing 16. As better seen in FIGURE 2, the diaphragm 118 includes two concentric convolutions 126 and 128. The usual diaphragm washer 130 is formed in this case to include an annulus portion 131 which contacts the diaphragm 118 intermediate the two convolutions 126 and 128. The washer 130 is loosely fitted around the nut 122 in order to be free to move independently of member 112, and its inside diameter is of such a dimension that it may contact the upper surface of the ring 120 for a purpose to be described. A resilient means, such as a spring 132, is confined between the annulus portion 131 of the washer 130 and a fixed retainer member 134. The retainer member 134 may, if desired, be manually adjusted by means of an adjustable screw 136, threadedly inserted through a suitable opening in a wall of the housing 16. The outer edge 137 of the diaphragm washer 130 at times abuts against a circular stop 138 formed in the cylindrical wall of the chamber 124. The chamber 124 is subjected to air at ambient pressure, $P_a$, through openings 140 formed through a wall of the housing 16.

*Operation*

While a detailed operation of the fuel control 12 will not be described herein, as this has been disclosed in the above mentioned application Ser. No. 264,117, it is deemed advisable to give a brief summary of its operation, prior to discussing the improvement accomplished by the invention. As explained above, fuel from the tank 38 is supplied via the conduits 42 and 44 to the fuel metering system 14 by means of pump 40, which is usually (but not necessarily) driven by the engine 10 and the capacity of which is more than sufficient to supply the total fuel requirements for any condition of engine operation. The portion of the inlet fuel actually supplied to the engine 10 via the conduit 46 is, of course, determined automatically by the fuel system components 14 and 16.

It is apparent that all of the inlet fuel goes to the engine 10, except that fuel which is bypassed from the chamber 52 and the branch passageway 86, through the passageways 74 and 76, into the conduit 48, and thence back to the inlet of the pump 40. The amount of fuel bypassed is controlled by relatively small movement of the short stroke diaphragm 118 and its associated valve stem 54, in response to changes in compressor discharge pressure, CDP. CDP is a gauge pressure by virtue of the chamber 124 being exposed to ambient pressure, $P_a$.

For purposes of illustration, it can be assumed that the moment balance lever 50 is in equilibrium and that CDP decreases for some reason or another that is not important in this discussion. With that assumption in mind, it can be seen that as the valve stem 54 and the attached lever arm 50 move downwardly (FIGURE 1) in response to the decrease in CDP in the chamber 104, more fuel is bypassed through the ports 66 and 68 and the passageways 74 and 76, respectively, to the inlet of the pump 40 through the passageway 48. This results in a decrease in pressure in the chamber 52, and the fuel metering valve 49 of the system 14 would be urged toward a more nearly closed position in accordance with the teachings of application Ser. No. 264,117, resulting in a decrease in pressure in the passageway 102 and the feedback chamber 90 beneath the diaphragm 92.

The fuel metering valve 49 may be contoured in a manner such that the pressure differential thereacross, and hence across the diaphragm 92, will decrease lineally as the fuel flow, $W_f$, decreases. The resultant lesser downward force on the stem 100 exactly balances the reduced upward force on the valve stem 54 and results in a return of the moment balance lever 50 to equilibrium. In other words, a reduction in force $F_1$ results in a reduction in force $F_2$ so as to return the system to equilibrium. The term "closed-loop" is commonly applied to this null (very low travel) type equilibrium-seeking moment balance system, and the above type of operation takes place whenever anything occurs to throw the system out of balance.

As indicated above, heretofore, the selected engine pressure parameter, in this case, CDP, actuated the movement of the valve stem 54 and its associated moment balance lever 50, by virtue of its influence on some suitable pressure responsive device. Such a device may consist of a diaphragm, where a compressor rise or gauge pressure parameter is desired, or a bellows, where an altitude-compensating absolute pressure parameter is desired. In accordance with the invention, the usual single convolution diaphragm is replaced by the novel diaphragm 118 having the dual concentric convolutions 126 and 128 formed thereon.

Figure 3:
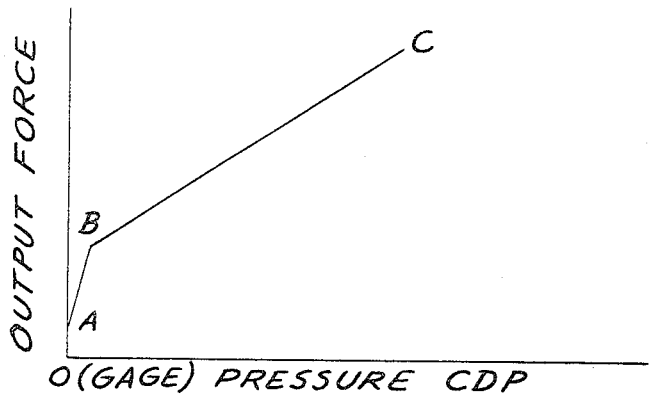
FIGURE 3 is a graph illustrating a principal characteristic of the invention.

In operation, the effect of such a diaphragm configuration is to influence the usual linear output force vs. pressure curve by biasing the beginning portion thereof, as illustrated in FIGURE 3, in order to obtain a suitable engine starting schedule for the particular engine 10 involved. This is accomplished in the following manner: During the period wherein the values of CDP in the chamber 104 are less than a predetermined amount, the spring 132 in the chamber 124 maintains the washer 130 in contact with the ring 120, thereby permitting the pressure CDP to move the diaphragm 118 and the member 112 upwardly and downwardly as a unit. This action progressively opens and closes the bypass valves 62/66 and 64/68. So long as CDP increases, but remains within the predetermined limit, it acts upon the full area, $A_{C2}$ (FIGURE 2), of the outer convolution 128, producing the relatively steep force vs. pressure curve A–B of FIGURE 3.

Once the force CDP acting upon that area which is between the two convolutions 126 and 128, namely $A_{C2}-A_{C1}$, exactly balances the force of the spring 132, the washer 130 will thereafter be lifted upwardly, out of contact with the ring 120. As CDP continues to increase, it will impart a lesser force on the valve stem 54, as a result of its effect on the smaller area, $A_{C1}$, only. This, of course, produces the substantially shallower force vs. pressure curve B–C of FIGURE 3. After leaving contact with ring 120, the washer 130 will continue to move upwardly until it abuts against the stop 138, but, in the process, it no longer has any effect on the system.

It should be apparent that, while the invention has been illustrated and described relative to influencing the flow of fuel to a gas turbine engine, it could very well serve in many different non-turbine applications. For example, such a pressure responsive device could be used in conjunction with any servomechanism, as a means for transmitting a force thereto.

It should also be readily apparent that the invention could be used in any surrounding media and is not at all limited to an air environment application, as described above. For example, it would be effectively used in lieu of the diaphragm 92 between the fuel chambers 52 and 90.

While but one embodiment of the invention has been disclosed and described, it is apparent that other modifications of the invention are possible within the scope of the appended claims.

What I claim as my invention is:

1. A device responsive to varying applied fluid pressure and capable of providing an output force having a plurality of different linear relationships to changing fluid pressure for different ranges of the fluid pressure applied, said device comprising a body formed to provide a fluid chamber having a fluid inlet for connection to a source of said varying fluid pressure, a continuously sealed pressure responsive movable wall structure forming a portion of said chamber, output force means operatively connected to said movable wall structure and adapted for cooperation with an external mechanism, said movable wall structure comprising a generally peripherally retained relatively flexible wall portion, yieldable abutment means positioned externally of said chamber and effective for at times operatively engaging said output force means, said yieldable abutment means also having a peripheral-like portion effective to be at times operatively engaged by said flexible wall portion, said flexible wall portion being effective whenever said yieldable abutment means is operatively engaging said output force means and is in turn operatively engaged by said flexible wall portion for defining a first effective pressure responsive area against which a fluid pressure below a predetermined pressure value may act for urging actuation of said output force means, and said flexible wall portion also being effective whenever said yieldable abutment means is not operatively engaging said output force means but is operatively engaged by said flexible wall portion along said peripheral-like portion for defining a second effective pressure responsive area less than said first area against which a fluid pressure of a magnitude at least equal to said predetermined pressure value may act for urging further actuation of said output force means.

2. A device such as that recited in claim 1, wherein said output force means is urged outwardly with respect to said chamber by first resilient means and said yieldable abutment means is urged inwardly with respect to said chamber by second resilient means.

3. A device such as that recited in claim 2, including adjustment means for varying the force applied by said second resilient means.

4. A device such as that recited in claim 1, wherein stop means are provided for said yieldable abutment means to limit its movement outwardly with respect to said chamber.

5. A device responsive to varying applied fluid pressure and capable of providing an output force having a plurality of different linear relationships to changing fluid pressures for different ranges of the fluid pressure applied, said device comprising a body formed to provide a fluid chamber having a fluid inlet for connection to a source of said varying fluid pressure, a continuously sealed pressure responsive movable wall, output force means connected to said movable wall and adapted for cooperation with an external mechanism, said movable wall having means associated therewith and cooperating with said output force means for changing the effective pressure responsive area thereof upon the attainment of some predetermined fluid pressure between said pressure ranges, said movable wall comprising a flexible diaphragm having said output force means connected to the center portion thereof, the portion of said output force means connected to said diaphragm having an annular flange on the side of said diaphragm opposite said chamber, said means associated with said diaphragm and cooperating with said output force means comprising an annular washer-like member having a central opening formed therein for receiving a free end of said output force means thereby providing for the free movement therethrough of said free end, said central opening being of a diameter smaller than said flange so as to enable said washer-like member to at times engage said flange, said washer-like member being urged toward said diaphragm by resilient means so that said washer-like member is in engagement with said flange at pressures insufficient to overcome said resilient means whereby the effective area of said diaphragm includes said washer and said output force means, said washer-like member being separated from said flange when the applied pressure becomes sufficient to overcome said resilient means, whereby the effective area of said diaphragm becomes a lesser area including said output force means.

References Cited

UNITED STATES PATENTS 1,819,947 8/1931 De Lavaud.
2,433,221 12/1947 Huber.
3,143,043 8/1964 Kinney _____ 92—94

ALAN COHAN, *Primary Examiner.*

D. J. ZOBKIW, *Assistant Examiner.*

U.S. Cl. X.R.

60—39.28; 92—98, 104; 137—117